(12) United States Patent
Tie Long et al.

(10) Patent No.: US 11,618,952 B2
(45) Date of Patent: Apr. 4, 2023

(54) SURFACE TREATMENT METHOD OF MAGNESIUM FOR THE ASSEMBLY OF POLYMER AND MAGNESIUM

(71) Applicant: DONGGUAN DSP TECHNOLOGY CO., LTD., Dongguan (CN)

(72) Inventors: Guo Tie Long, Shenzhen (CN); Tan Yonggang, Shenzhen (CN); Zhen Guo Xing, Huizhou (CN)

(73) Assignee: DONGGUAN DSP TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 17/807,630

(22) Filed: Jun. 17, 2022

(65) Prior Publication Data
US 2022/0403526 A1 Dec. 22, 2022

(30) Foreign Application Priority Data

Jun. 18, 2021 (JP) .............................. JP2021-102059

(51) Int. Cl.
*C23C 22/78* (2006.01)
*C23C 22/57* (2006.01)
*C23C 22/83* (2006.01)

(52) U.S. Cl.
CPC .............. *C23C 22/57* (2013.01); *C23C 22/78* (2013.01); *C23C 22/83* (2013.01)

(58) Field of Classification Search
CPC ..................................................... C23C 22/83
See application file for complete search history.

(56) References Cited

FOREIGN PATENT DOCUMENTS

| JP | S5723057 A | * | 2/1982 | ............. C23C 14/02 |
| WO | WO-2020235070 A1 | * | 11/2020 | ............. C25D 11/30 |

OTHER PUBLICATIONS

WO-2020235070-A1_English_translation (Year: 2020).*

* cited by examiner

Primary Examiner — Hai Y Zhang
(74) Attorney, Agent, or Firm — Greer, Burns & Crain, Ltd (57) ABSTRACT

A method to treat the magnesium surface to manufacture the metallic assembly with the polymer and magnesium to have excellent bonding strength is disclosed.
As a method to treat the magnesium surface for the bonded coupling of the mixture of the polymer and magnesium, this is a method including,
(a) an etching step, wherein the magnesium surface is treated with an acidic solution;
(b) a first surface treatment step, wherein the magnesium surface is treated with ultrasonic waves;
(c) a second surface treatment step, wherein the magnesium surface is treated with an acidic solution;
(d) a first silane coupling processing step, wherein the magnesium surface is treated with ultrasonic waves;
(e) a surface activation treatment step, wherein the magnesium surface is treated with acidic solution; and
(f) a second silane coupling processing step, wherein the magnesium surface is treated with ultrasonic waves.

2 Claims, 7 Drawing Sheets

FIG. 1

↳ ↳ ↳  Microcrack

≀ ≀ ≀  First Silane Coupling

≀ ≀ ≀  40% Remained First Silane Coupling by a Surface Activation Treatment

≀ ≀ ≀  Second Silane Coupling

Zero - T

SURFACE TREATMENT METHOD OF MAGNESIUM FOR THE ASSEMBLY OF POLYMER AND MAGNESIUM

BACKGROUND

This invention is the surface treatment method of magnesium for the bonded coupling of the assembly of polymer and magnesium. More specifically, through the primary and secondary silane coupling treatment by ultrasonic waves on the surface of magnesium, this is a method to treat the magnesium surface for the assembly of polymer and magnesium to maximize the bonding of the assembly of the polymer and the surface of the magnesium.

The assembly of polymer and magnesium has been used in various ways for lithium-ion batteries for automotive, smartphones, or electronic devices, requiring waterproof characteristics. The bonding strength of polymer and magnesium, however, has been pointed out as a potential issue due to its low reliability.

Thus, by anodizing the magnesium and raising the activity and frictional force of the surface of magnesium, an even stronger bonding between magnesium and polymer has been used for manufacturing thereof. However, even with the etching treatment and ultrasonic waves treatment, it is impossible to acquire sufficient adhesion and shielding with polymer.

SUMMARY

This invention is a method to treat the surface of magnesium to solve the above issue. The purpose of this invention is to provide a method to treat the surface of magnesium to manufacture metallic assembly of polymer and magnesium with excellent bonding strength and shielding.

Measures to Solve the Task

The purpose of the invention is a method to treat the magnesium surface for the bonded coupling of the mixture of the polymer and magnesium, this is a method comprising,
(a) an etching step wherein the magnesium surface is treated with an acidic solution,
(b) a first surface treatment step wherein the magnesium surface is treated with ultrasonic waves.
(c) a second surface treatment step wherein the magnesium surface is treated with an acidic solution;
(d) a first silane coupling processing step wherein the magnesium surface is treated with ultrasonic waves
(e) a surface activation treatment step wherein the magnesium surface is treated with acidic solution
(f) a second silane coupling processing step wherein the magnesium surface is treated with ultrasonic waves.

The step (a), proceeds with an acidic solution mixing sulfuric acid, phosphoric acid and trace amounts of nitric acid, at 30~60° C. for 10~180 seconds.

The step (b), proceeds by ultrasonic treatment with the alkali cleaning agent, at 30~60° C. at 24~100 kHz and 400 W for 10~180 seconds.

The step (c), proceeds a second etching with an acidic solution mixing sulfuric acid, phosphoric acid and trace amounts of nitric acid, at 30~60° C. for 10~180 seconds.

The step (d), proceeds with a mixed solution of 0.1~20 wt. % $C_2K_2O_4$, 0.1~10 wt. % $Na_2O_3Si$, 0.01~1 wt. % $C_3H_8O_3$ and 0.001~0.01 wt. % $C_2OH_{24}O_{10}S_2$ adding 0.11~1 wt. % Silane Coupling agent, at 30~70° C., with 24~100 kHz and 400 W for 10~300 seconds.

The step (e), proceeds with a mixed acidic solution of sulfuric acid and hydrochloric acid at a 30~70° C. for 10~300 seconds.

The step (f), proceeds with a mixed solution of 0.1~20 wt. % $C_2K_2O_4$, 0.1~10 wt. % $Na_2O_3Si$, 0.01~1 wt. % $C_3H_8O_3$ and 0.001~0.01 wt. % $C_2OH_{24}O_{10}S_2$ adding 0.1~1 wt. % Silane Coupling agent, at 30~70° C., with 24~100 kHz and 400 W for 10~300 seconds.

In the steps of (d) and (f), the Silane coupling additive as the additive is used one of $(RO)_3Si$—$(CH_2)_3$—$NH_2$, $(RO)_3Si$—$(CH_2)_2$—$Si(OC_2H_5)_3$, $(RO)_3Si$—$(CH_2)_3$—$SH$, $(RO)_3Si$—$CH$=$CH_2$, $(RO)_3Si$—$(CH_3)_3$—$OOC(CH_3)$ $C$=$CH_2$, $(RO)_3Si$—$(CH_3)_3$—$O$—$CHCH_2O$ and $(RO)_3Si$—$(CH_2)_{15}CH_3$.

Effects of Invention

According to the present invention, the magnesium surface is roughened by an etching process utilizing an acidic solution to the magnesium surface, a first surface treatment with ultrasonic waves to generate cracks in the surface with mite, and through a second etching process utilizing an acidic solution, micro The surface is further roughened with micro-cracks through second etching using acidic solution. After this, through the first and second silane coupling treatment using ultrasonic waves, a large amount of micro-cracks are generated on the surface, and then silane penetrates into the generated cracks to maximize the bonding strength between the polymer and magnesium through the bonding action of the polymer and silane. The effect is to maximize the bonding strength between the polymer and magnesium by the bonding action of the polymer and silane.

BRIEF DESCRIPTION OF THE DRAWINGS

FIGS. 4A-4C show a T-Bend test method and a result state after each of the conventional products and the invention, more specifically

FIGS. 7A-7D show photographs of a fracture surface by a tensile test after each of the conventional products and the invention; more specifically

FIG. 7B is a picture of the test results showing "No Good" quality from the test results of the T-Bend test; and.

DETAILED DESCRIPTION

Referring the below schematics, this explains how to manufacture the bonding of the polymer and magnesium with this invention.

This invention is a method to treat the surface of magnesium in order to maximize the bonded coupling of the polymer mixture with (a) an etching step wherein the magnesium surface is treated with an acidic solution,
(b) a first surface treatment step wherein the magnesium surface is treated with ultrasonic waves.
(c) a second surface treatment step wherein the magnesium surface is treated with an acidic solution;
(d) a first silane coupling processing step wherein the magnesium surface is treated with ultrasonic waves
(e) a surface activation treatment step wherein the magnesium surface is treated with acidic solution
(f) a second silane coupling processing step wherein the magnesium surface is treated with ultrasonic waves.

The etching step (a), proceeds with an acidic solution mixing sulfuric acid, phosphoric acid and trace amounts of nitric acid, at 30~60° C. for 10~180 seconds.

The etching creates irregular etching patterns on the surface of the magnesium and roughens the surface of the magnesium.

The step (b), proceeds by ultrasonic treatment with the alkali cleaning agent, at 30~60° C. at 24~100 kHz and 400 W for 10~180 seconds.

The ultrasonic treatment produces microcracks on the etched magnesium surface.

The step (c), proceeds a secondary etching with an acidic solution mixing sulfuric acid, phosphoric acid and trace amounts of nitric acid, at 30~60° C. for 10~180 seconds.

Secondary etching forms irregular etch marks on the magnesium surface, further roughening the surface.

In the (c) step, the electrolyte to be used may be one of $C_2K_2O_4$, $NaHCO_3$, $NaOH$, $Na_2CO_3$, $Na_2SO_4$, $K_2SO_3$, $Na_2SO_3$, $NaNO_2$, $KNO_2$, $NaNO_3$, $NaClO_4$, $CH_3COONa$, $Na_2B_2O_7$, $NaH_2PO_2$, $(NaPO_3)_6$, $Na_2MoO_4$, $Na_3SiO_3$, and $Na_2HPO_3$.

The step (d), proceeds with a mixed solution of 0.1~20 wt. % $C_2K_2O_4$, 0.1~10 wt. % $Na_2O_3Si$, 0.01~1 wt. % $C_3H_8O_3$ and 0.001~0.01 wt. % $C_2OH_{24}O_{10}S_2$ adding 0.1~1 wt. % Silane Coupling agent, at 30~70° C., with 24~100 kHz and 400 W for 10~300 seconds.

Microcracks are additionally formed on the etched magnesium surface, and a silane coupling agent is penetrated into the formed microcrack region.

In the (d) step, the electrolyte to be used may be one of $C_2K_2O_4$, $NaHCO_3$, $NaOH$, $Na_2CO_3$, $Na_2SO_4$, $K_2SO_3$, $Na_2SO_3$, $NaNO_2$, $KNO_2$, $NaNO_3$, $NaClO_4$, $CH_3COONa$, $Na_2B_2O_7$, $NaH_2PO_2$, $(NaPO_3)_6$, $Na_2MoO_4$, $Na_3SiO_3$, and $Na_2HPO_3$.

In the (d) step, the Silane coupling additive as the additive may be one of $(RO)_3Si$—$(CH_2)_3$—$NH_2$, $(RO)_3Si$—$(CH_2)_2$—$Si(OC_2H_5)_3$, $(RO)_3Si$—$(CH_2)_3$—$SH$, $(RO)_3Si$—$CH$=$CH_2$, $(RO)_3Si$—$(CH_3)_3$—$OOC(CH_3)C$=$CH_2$, $(RO)_3Si$—$(CH_3)_3$—$O$—$CHCH_2O$ and $(RO)_3Si$—$(CH_2)_{15}CH_3$.

The step (e), proceeds with a mixed acidic solution of sulfuric acid and hydrochloric acid at a 30~70° C. for 10~300 seconds.

The surface is etched to make it rougher, and at the same time, about 60% of the magnesium surface containing a silane coupling agent penetrating into the microcrack is removed with etching.

The step (f), proceeds with a mixed solution of 0.1~20 wt. % $C_2K_2O_4$, 0.1~10 wt. % $Na_2O_3Si$, 0.01~1 wt. % $C_3H_8O_3$ and 0.001~0.01 wt. % $C_2OH_{24}O_{10}S_2$ adding 0.1~1 wt. % Silane Coupling agent, at 30~70° C., with 24~100 kHz and 400 W for 10~300 seconds.

Microcracks are additionally formed on the etched magnesium surface, and a silane coupling agent is penetrated into the formed microcrack region.

In the (f) step, the Silane coupling additive as the additive may be one of $(RO)_3Si$—$(CH_2)_3$—$NH_2$, $(RO)_3Si$—$(CH_2)_2$—$Si(OC_2H_5)_3$, $(RO)_3Si$—$(CH_2)_3$—$SH$, $(RO)_3Si$—$CH$=$CH_2$, $(RO)_3Si$—$(CH_3)_3$—$OOC(CH_3)C$=$CH_2$, $(RO)_3Si$—$(CH_3)_3$—$O$—$CHCH_2O$ and $(RO)_3Si$—$(CH_2)_{15}CH_3$.

After the step (c), upon the magnesium with the second anodizing treatment, the ultrasonic treatment shall proceed with a solvent of $H_2SO_4$ of 0.001~0.01 wt. % after adding an additive, $C_2H_4(OH)_2$ of 0.001~0.01 wt. %, for 1 to 3 minutes at 400 W, 24~100 kHz, at the temperature of 30 to 60° C.

By the first and second silane coupling treatment using ultrasonic waves, surface roughness is increased on the surface of magnesium, a large amount of fine micro-cracks are formed, such that the silane coupling agent penetrates into the formed micro-cracks, and is coupled to the polymer through a chemical reaction. There is an effect of maximizing the bonding force between the polymer and magnesium by such surface roughness and microcracks and silane coupling agents.

Figure 1:
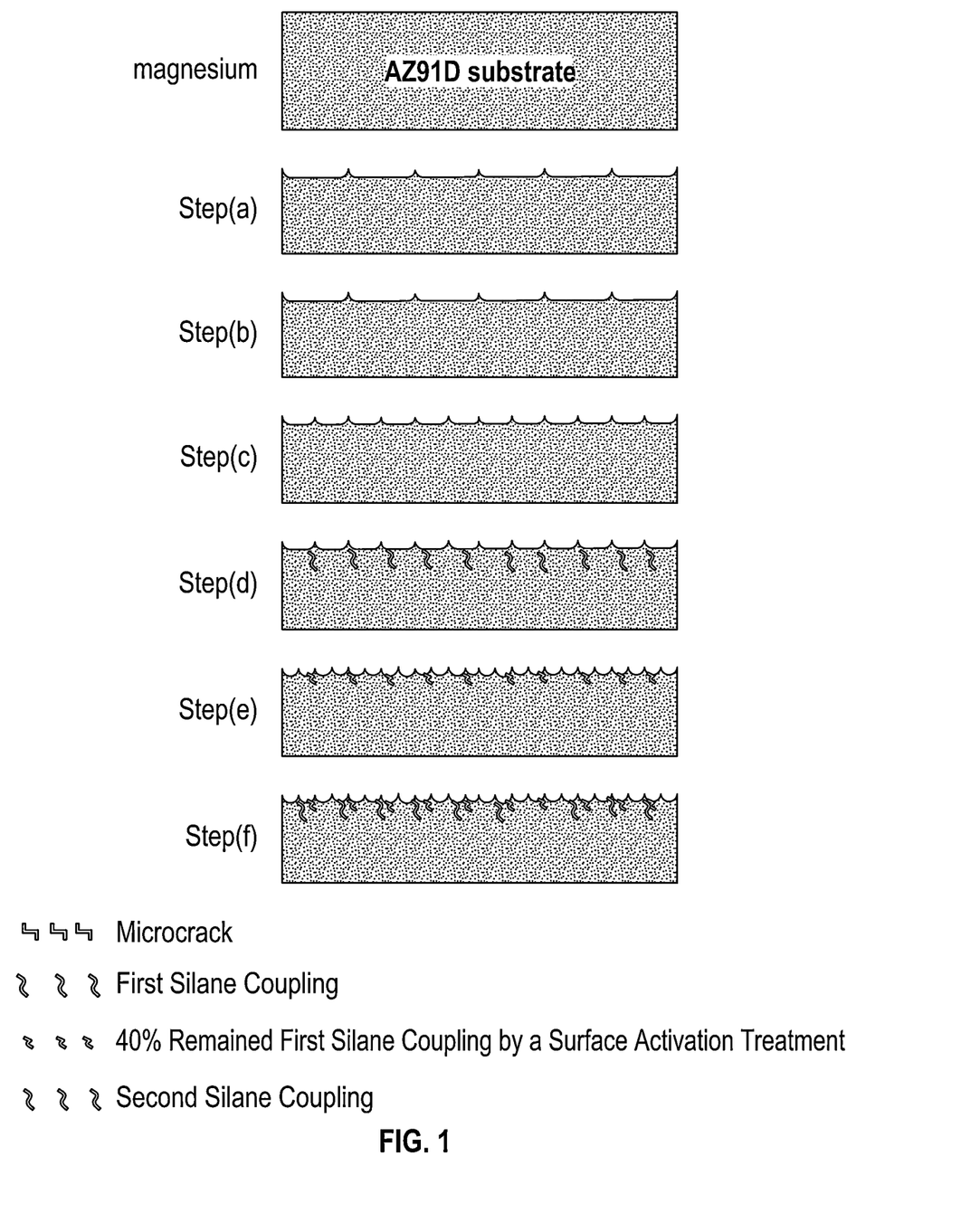
FIG. 1 shows the change of oxide film by each process step of magnesium surface treatment according to the present invention.

FIG. 1 represents the changes in the oxide film from each process after treating the surface of magnesium.

Figure 2:
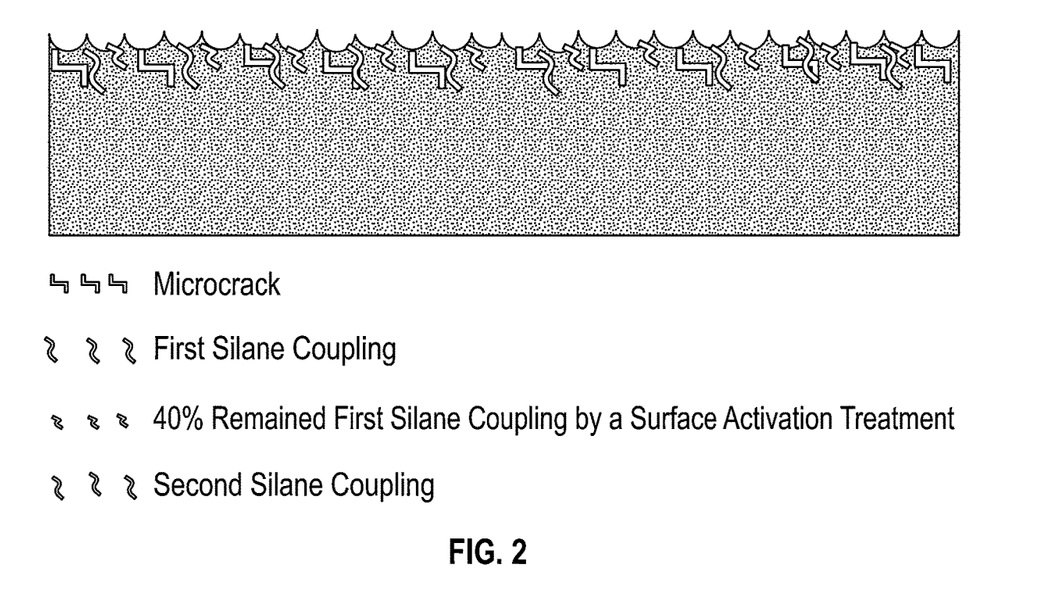
FIG. 2 shows the detailed pattern of the final magnesium surface of FIG. 1.
Figure 3:
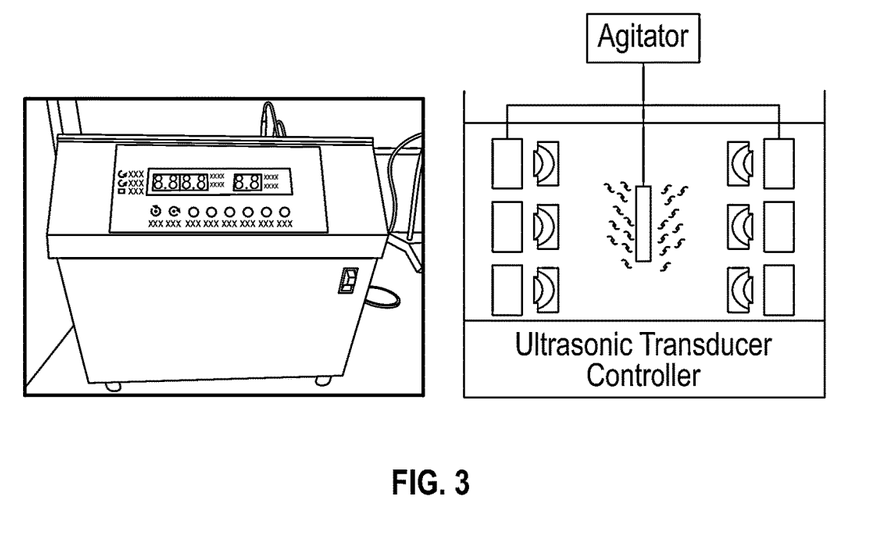
FIG. 3 shows an ultrasonic device.
Figure 4A:
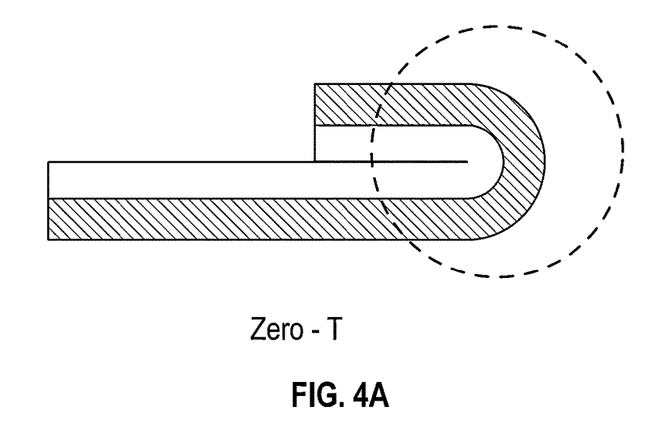
FIG. 4A illustrates the magnesium specimen to be treated.
Figure 4B:
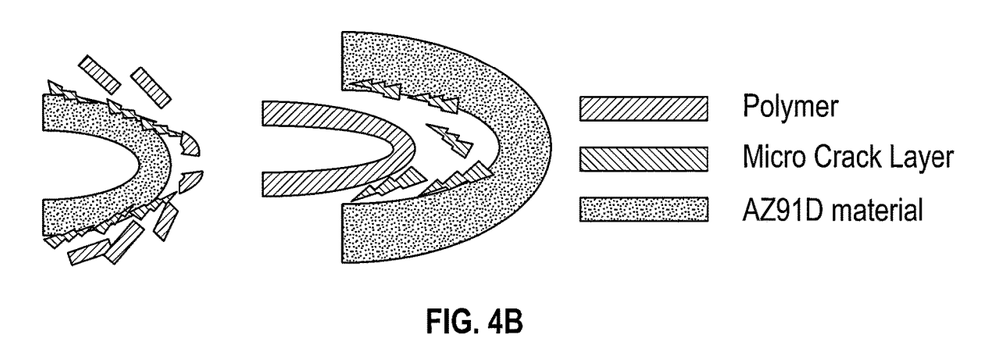
FIG. 4B illustrates the magnesium being treated to receive the polymer.
Figure 4C:
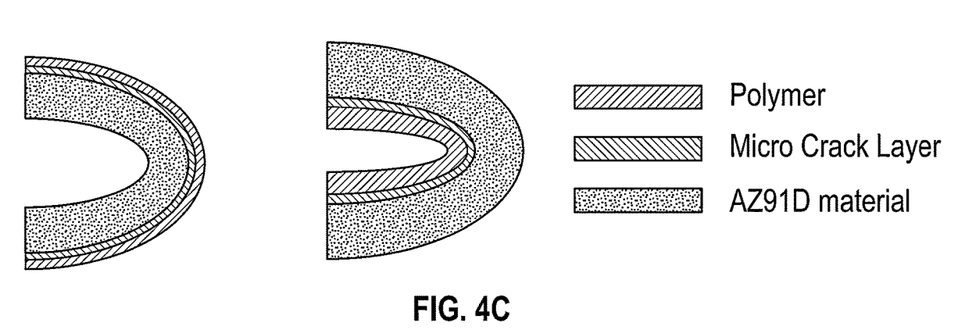
FIG. 4C illustrates the polymer joined to the magnesium.

FIG. 2 represents the specific shapes of the oxide film, generated from each process.

After this, specific examples and figures will be explained.

Embodiment 1

The step (a), proceeds with an acidic solution mixing sulfuric acid, phosphoric acid and trace amounts of nitric acid, at 30~60° C. for 10~180 seconds.

The step (b), proceeds by ultrasonic treatment with the alkali cleaning agent, at 30~60° C. at 24~100 kHz and 400 W for 10~180 seconds.

The step (c), proceeds a secondary etching with an acidic solution mixing sulfuric acid, phosphoric acid and trace amounts of nitric acid, at 30~60° C. for 10~180 seconds.

The specimens were made by conventional methods.

Embodiment 2

After step (a), the step (b) and the step (c),

The step (d), proceeds with a mixed solution of 0.1~20 wt. % $C_2K_2O_4$, 0.1~10 wt. % $Na_2O_3Si$, 0.01~1 wt. % $C_3H_8O_3$ and 0.001~0.01 wt. % $C_2OH_{24}O_{10}S_2$ adding 0.1~1 wt. % Silane Coupling agent, at 30~70° C., with 24~100 kHz and 400 W for 10~300 seconds.

The specimens were made by above methods.

Embodiment 3

After step (a), the step (b), the step (c) and (d)

The step (e), proceeds with a mixed acidic solution of sulfuric acid and hydrochloric acid at a 30~70° C. for 10~300 seconds.

The specimens were made by above methods.

Embodiment 4

After step (a), the step (b), the step (c), the step (d) and the step (e)

The step (f), proceeds with a mixed solution of 0.1~20 wt. % $C_2K_2O_4$, 0.1~10 wt. % $Na_2O_3Si$, 0.01~1 wt. % $C_3H_8O_3$ and 0.001~0.01 wt. % $C_2OH_{24}O_{10}S_2$ adding 0.11 wt. % Silane Coupling agent, at 30~70° C., with 24~100 kHz and 400 W for 10~300 seconds.

The specimens were made by above methods.

With the specimens from embodiments 1 to 4, tests were conducted to measure the bonding strength and sealing quality by the resistance test, T-Bend test, tensile strength test, and rest time test.

The followings are the results thereof.

[Test 1]

By using the specimens from embodiment 1 to 4, to measure the bonding strength, after 1,000 hours of the temperature and humidity test, the T-bend test was conducted and the results thereof are marked in Table 1.

TABLE 1

| test piece | embodiment 1 | embodiment 2 | embodiment 3 | embodiment 4 |
|---|---|---|---|---|
| T-bend test | No Good | No Good | No Good | Good |

As shown in Table 1, it may be seen that only the samples of embodiment 4 is additionally performed, have best bonding strength between polymer and magnesium rather than the samples of embodiment 1, 2, and 3.

Figure 7A:
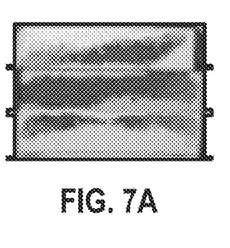
FIG. 7A is a specimen produced for the T-Bend test.
Figure 7B:
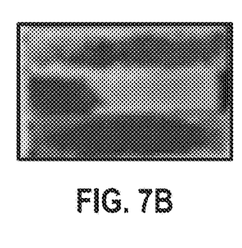

FIG. 7A is a specimen produced for the T-Bend test, and show a test method FIG. 7B is a picture of the test results showing "No Good" quality from the test results of the T-Bend test and how to conduct such a test.

Figure 7C:
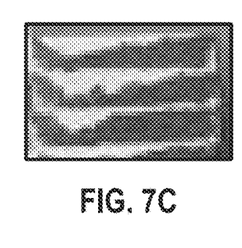
FIGS. 7C and 7D are pictures of the test results showing "Good" quality from the test results of the T-Bend test.

FIG. 7C is a picture of the test results showing "Good" quality from the test results of the T-Bend test and how to conduct such a test.

[Test 2]

Figure 6:
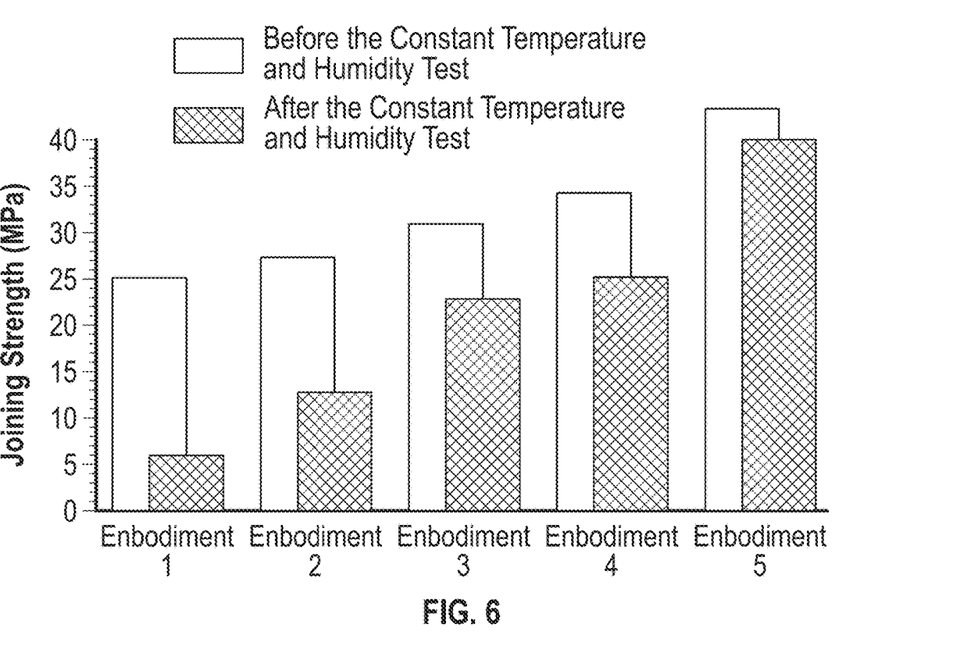
FIG. 6 is a graph showing the results of the tensile test after the constant temperature and humidity test of the conventional product and the invention, respectively.

By using the specimens from embodiments 1 to 4, to measure the bonding strength, after 1,000 hours of the temperature and humidity test, the tensile strength test was conducted and the results show in FIG. 6.

Figure 5A:
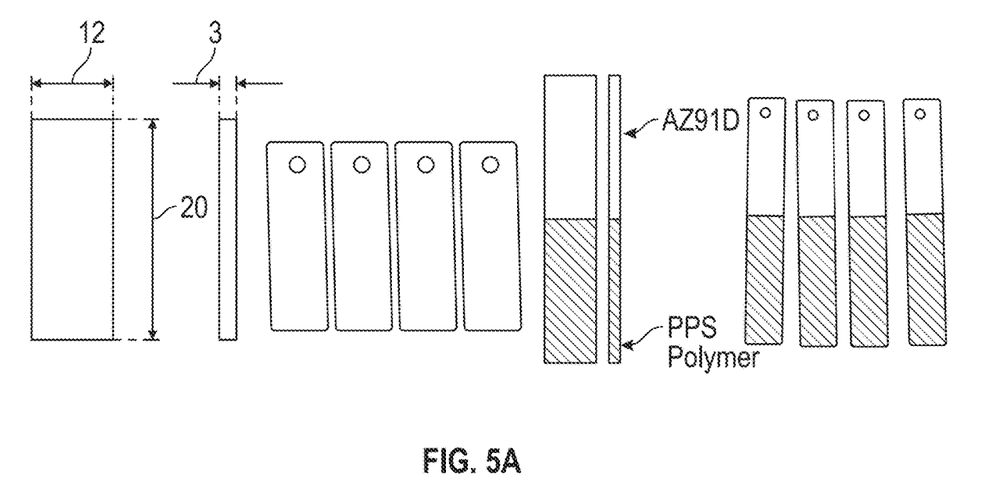
FIG. 5A shows a diagram showing specimens of magnesium combine with polymer.

FIG. 5A is a specimen produced for a tensile strength test, and it has the polymer overlaid on the magnesium specimen from each embodiment.

Figure 5B:
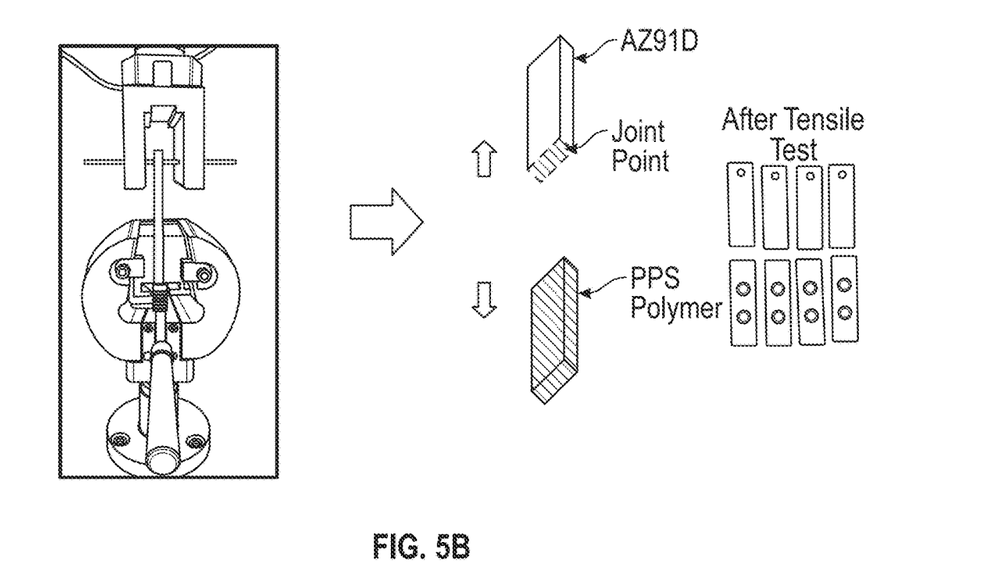
FIG. 5B shows an experimental apparatus for performing a method for tensile test after each of the conventional products and the invention, including combined magnesium and polymer specimens.

FIG. 5B is a picture of the experimental method of the tensile strength test.

Just as a graph in FIG. 6, rather than the specimen from embodiment 1, the specimen from embodiment 2 shows excellent tensile strength before and after the temperature and humidity test.

Also, rather than the specimen from embodiment 2, the specimen from embodiment 3 shows excellent tensile strength before and after the temperature and humidity test.

Finally, rather than the specimen from embodiment 3, the specimen from embodiment 4 shows excellent tensile strength before and after the temperature and humidity test.

FIG. 7 is a picture of the amount of the polymer remaining on the magnesium surface, separated from the specimens of embodiments 1 to 4 after conducting the experiments on the tensile strength after the temperature and humidity test.

FIG. 7A is a picture of the separated side of the specimen from embodiment 1, showing that 20% of the polymer remains on the magnesium surface due to the separation.

FIG. 7B is a picture of the separated side of the specimen from embodiment 2, showing that 40% of the polymer remains on the magnesium surface due to the separation.

FIG. 7C is a picture of the separated side of the specimen from embodiment 3, showing that 60% of the polymer remains on the magnesium surface due to the separation.

Figure 7D:
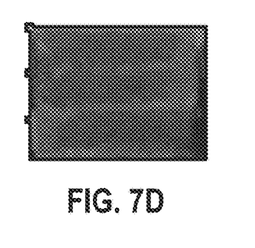

FIG. 7D is a picture of the separated side of the specimen from embodiment 4, showing that 80% of the polymer remains on the magnesium surface due to the separation.

Figure 8:
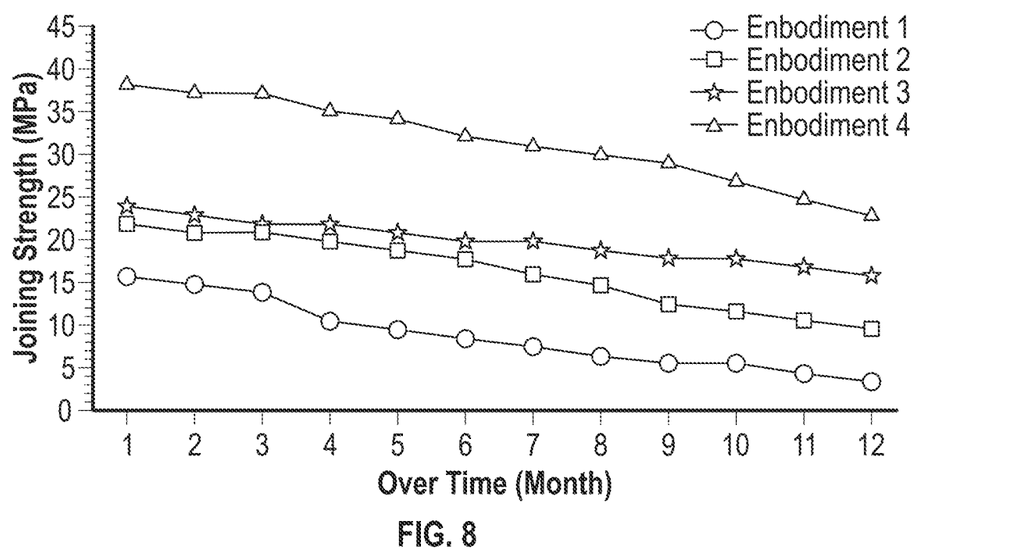
FIG. 8 is a comparison graph of the tensile experiment between the conventional product and the invention according to each neglect time.

The graph in FIG. 8 is the test results of the tensile strength for each embodiment after overlaying of 1 to 12 months.

Likewise, the decrease in tensile force over pass time is greater the specimen of embodiment 2 than in the specimen of embodiment 1.

Also, the decrease in tensile force over pass time is superior the specimen of embodiment 3 than in the specimen of embodiment 2.

Finally, the decrease in tensile force over pass time is better the specimen of embodiment 4 than in the specimen of embodiment 3.

[Test 3]

Figure 10:
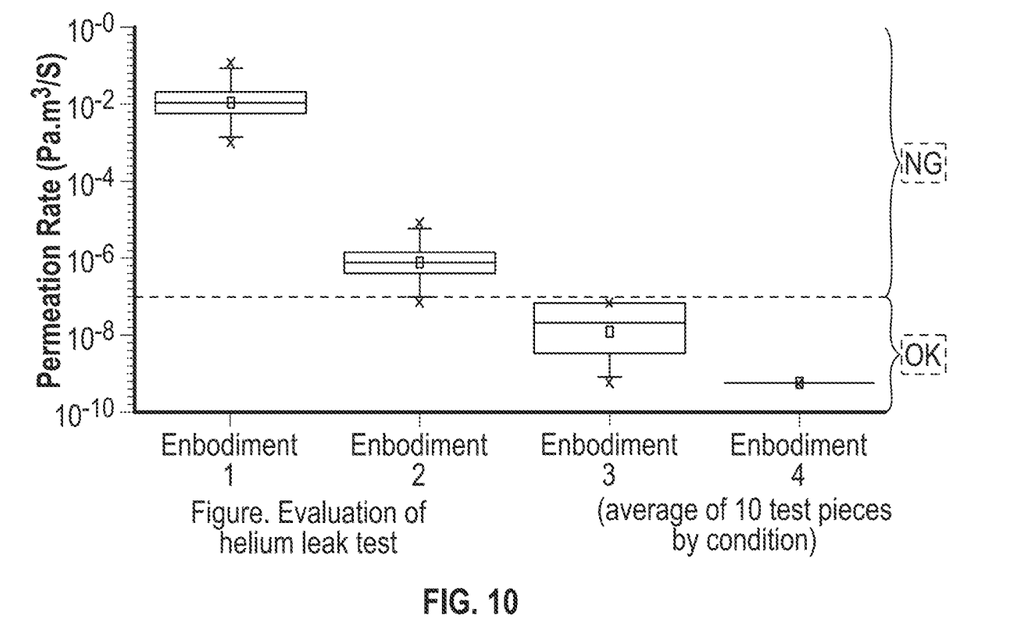
FIG. 10 is a sealed comparison graph of each of the conventional product and the invention.

By using the specimens from embodiments 1 to 4, to measure the sealing condition between the magnesium and polymer, the temperature and humidity test was conducted and the results thereof are shown in FIG. 10.

Just as a graph in FIG. 10, rather than the specimen from embodiment 1, the specimen from embodiment 2 shows better sealing quality.

Also, rather than the specimen from embodiment 2, the specimen from embodiment 3 shows better sealing quality.

Finally, rather than the specimen from embodiment 3, the specimen from embodiment 4 shows the best sealing quality.

Figure 9A:
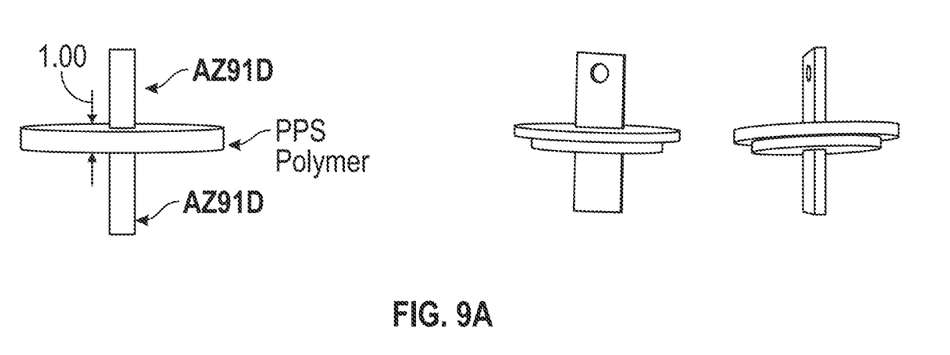
FIG. 9A shows views of a magnesium/polymer specimen suitable for a constant temperature and humidity test.

FIG. 9A is a picture of a specimen for a temperature and humidity test.

Figure 9B:
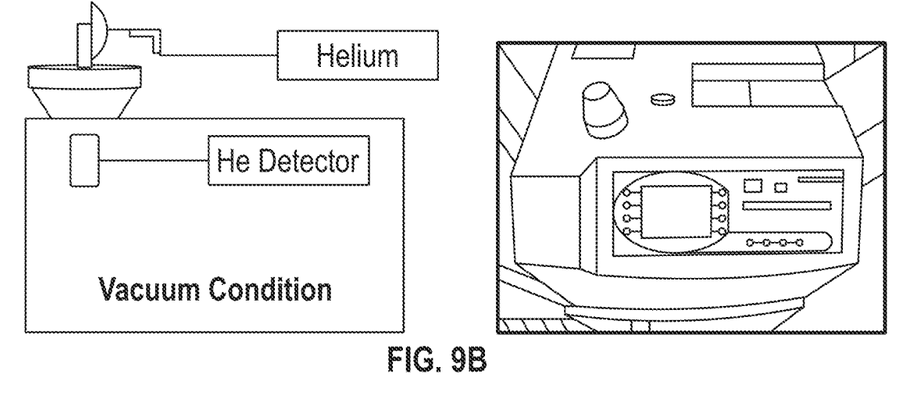
FIG. 9B illustrates a measuring machine for performing the test.

FIG. 9B is a picture of a device to experiment with the temperature and humidity test.

FEASIBILITY TO BE USED IN INDUSTRIES

This invention is a method to manufacture the assembly of the polymer and magnesium by reinforcing the bonding strength of the polymer and magnesium with treatments on the magnesium surface, enhancing the sealing quality of components, making them lighter, and saving money for those components.

The invention claimed is:

1. A method to treat a magnesium surface with a bonded coupling of a mixture of a polymer and magnesium, comprising:
   (a) etching the magnesium surface with an acidic solution;
   (b) treating the magnesium surface in (a) with ultrasonic waves as a first surface treatment step;

(c) treating the magnesium surface in (b) with an acidic solution as a second surface treatment step;
(d) treating the magnesium surface in (c) with ultrasonic waves as a first silane coupling processing step;
(e) treating the magnesium surface in (d) with acidic solution as a surface activation treatment step;
(f) treating the magnesium surface in (e) with ultrasonic waves as a second silane coupling step;

the step (a), is performed in an acidic solution mixing sulfuric acid, phosphoric acid and trace amounts of nitric acid, at 30~60° C. for 10~180 seconds;

the step (b), proceeds with ultrasonic treatment with an alkali cleaning agent, at 30~60° C. at 24~100 kHz and 400 W for 10~180 seconds;

the step (c), proceeds a secondary etching with an acidic solution mixing sulfuric acid, phosphoric acid and trace amounts of nitric acid, at 30~60° C. for 10~180 seconds;

the step (d), proceeds with a mixed solution of 0.1~20 wt. % $C_2K_2O_4$, 0.1~10 wt. % $Na_2O_3Si$, 0.01~1 wt. % $C_3H_8O_3$ and 0.001~0.01 wt. % $C_2OH_{24}O_{10}S_2$ adding 0.1~1 wt. % Silane Coupling agent, at 30~70° C., with 24~100 kHz and 400 W for 10~300 seconds;

the step (e), proceeds with a mixed acidic solution of sulfuric acid and hydrochloric acid at a 30~70° C. for 10~300 seconds; and the step (f), proceeds with a mixed solution of 0.1~20 wt. % $C_2K_2O_4$, 0.1~10 wt. % $Na_2O_3Si$, 0.01~1 wt. % $C_3H_8O_3$ and 0.001~0.01 wt. % $C_2OH_{24}O_{10}S_2$ adding 0.1~1 wt. % Silane Coupling agent, at 30~70° C., with 24~100 kHz and 400 W for 10~300 seconds.

2. The method of claim 1, in the step (d) and (f), the Silane Coupling agent is one of $(RO)_3Si—(CH_2)_3—NH_2$, $(RO)_3Si—(CH_2)_2—Si(OC_2H_5)_3$, $(RO)_3Si—(CH_2)_3—SH$, $(RO)_3Si—CH=CH_2$, $(RO)_3Si—(CH_3)_3—OOC(CH_3)C=CH_2$, $(RO)_3Si—(CH_3)_3—O—CHCH_2O$ and $(RO)_3Si—(CH_2)_{15}CH_3$.

* * * * *